INVENTOR.
IVAN A. FARNWORTH
BY M. Ralph Shaffer
HIS ATTORNEY

Feb. 14, 1961  I. A. FARNWORTH  2,971,614
AUTOMATIC TRAVEL ADJUSTER FOR AIR BRAKE PISTONS
Filed Aug. 31, 1959  4 Sheets-Sheet 2
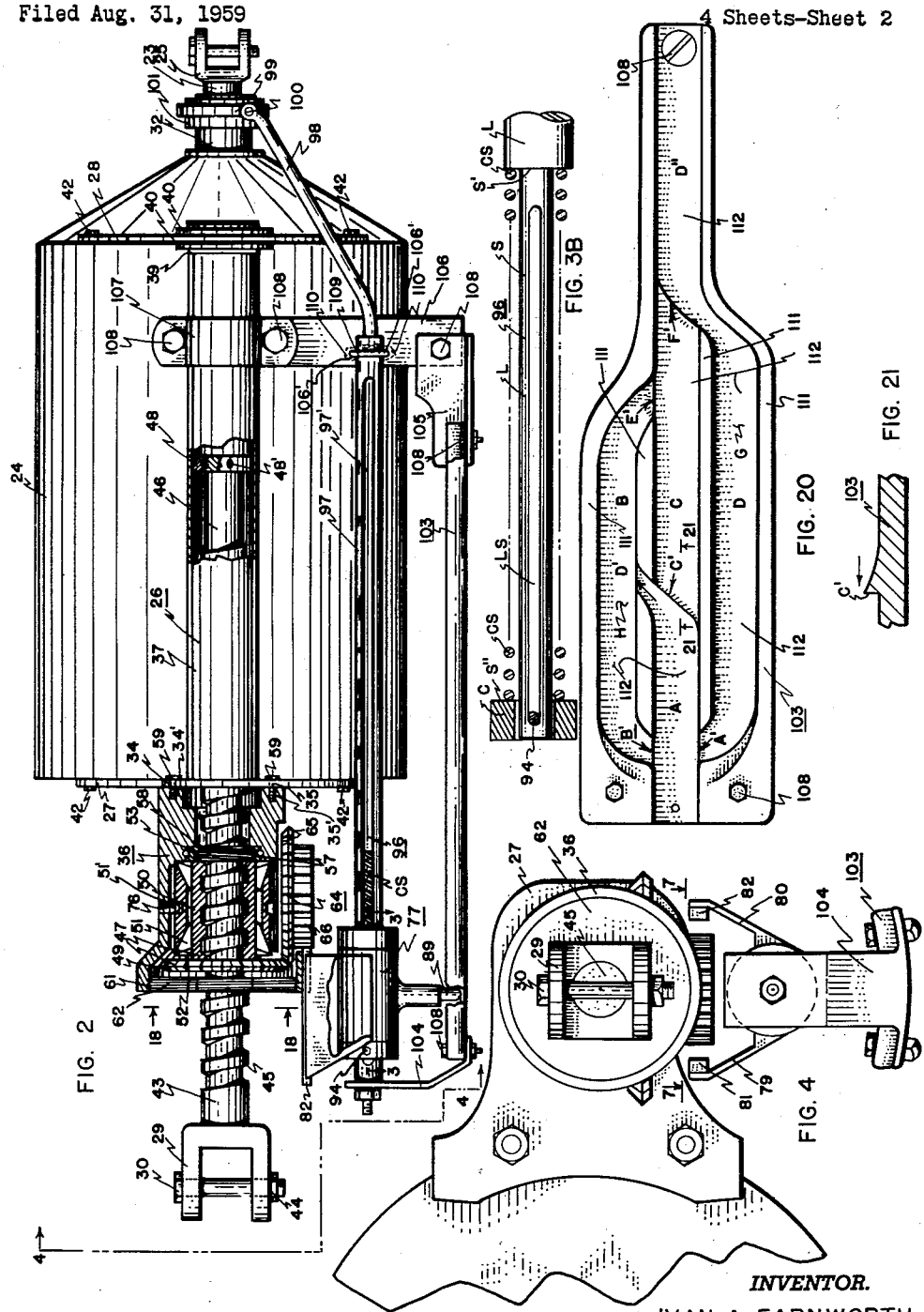
INVENTOR.
IVAN A. FARNWORTH
BY M. Ralph Shaffer
HIS ATTORNEY

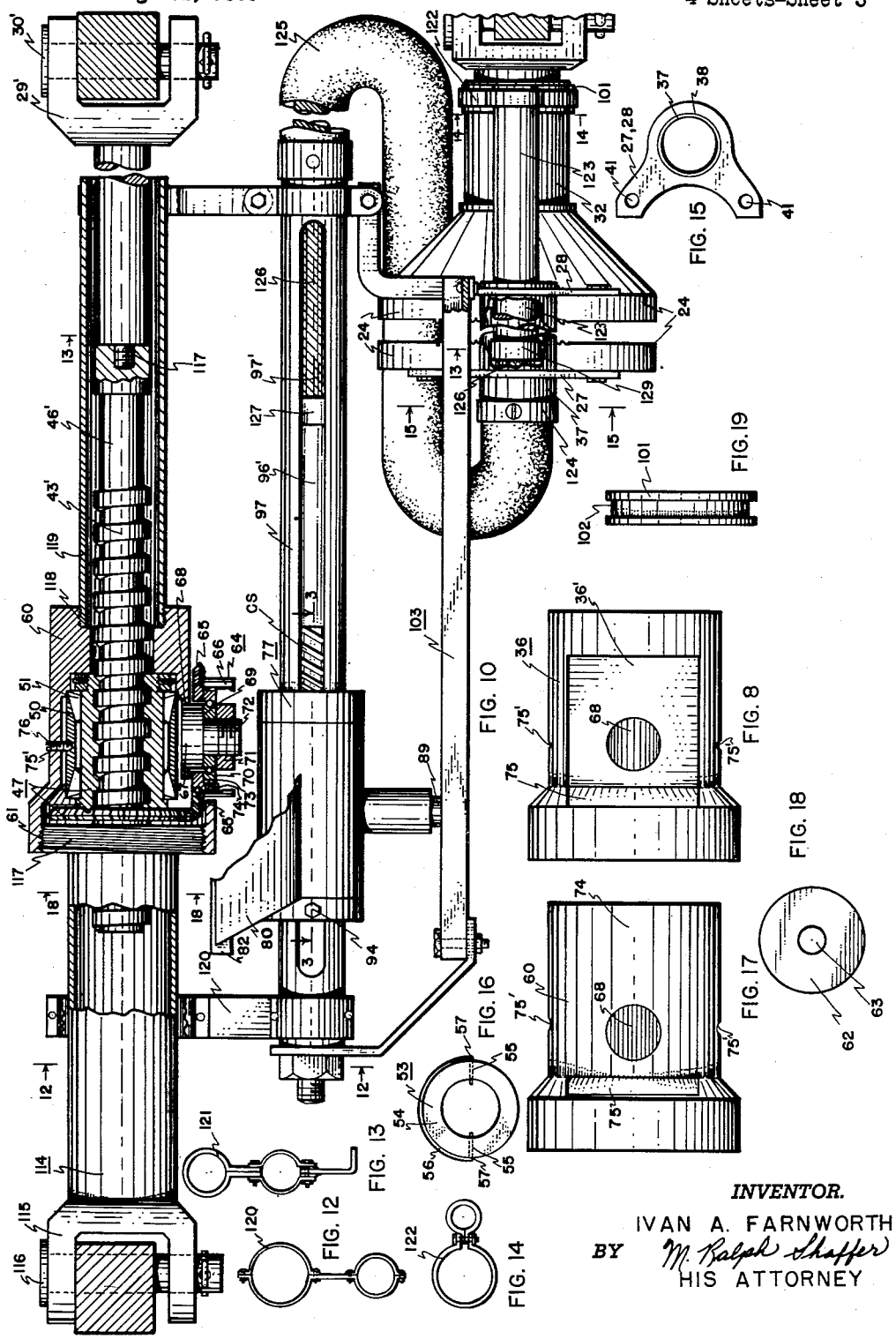

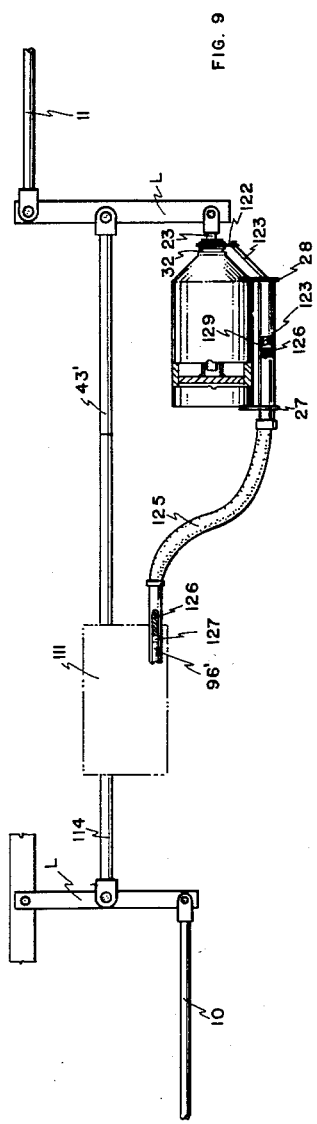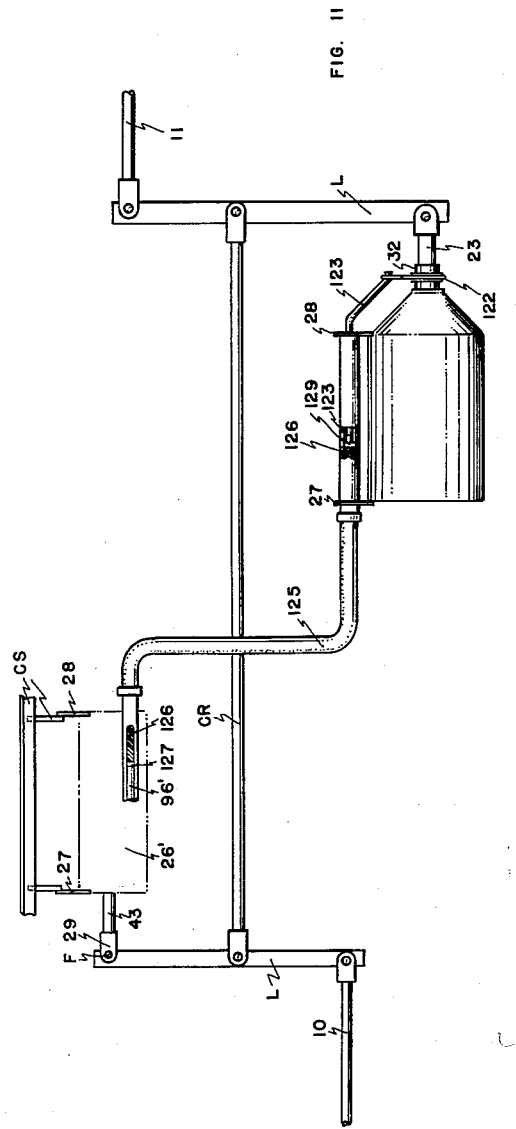

# 2,971,614

AUTOMATIC TRAVEL ADJUSTER FOR AIR BRAKE PISTONS

Ivan A. Farnworth, 441 S. State St., Orem, Utah

Filed Aug. 31, 1959, Ser. No. 837,094

12 Claims. (Cl. 188—202)

The invention relates to braking systems for railroad rolling stock, for example, and more particularly to compensating mechanisms therefor for automatically maintaining an adjustment of the linkage connecting an air brake piston with its associated brake mechanism so as to produce actuation of the brakes at a predetermined length of piston travel. The present invention is an improvement over the inventor's copending case, Serial Number 774,717 and entitled "Automatic Travel Adjuster for Air Brake Pistons," in that in the present case no pressure is exerted on the conventional hollow piston rod of the air brake cylinder. Rather, in one embodiment of the invention the compensating mechanism operates to adjust a lever fulcrum of the brake rigging to control the slack in the rigging itself; in a second embodiment the mechanism serves as a connecting rod device responsive to piston travel for exhibiting an effective length commensurate with proper rigging slack, so as to enable the accomplishment of brake set upon a normal eight-inch travel of the air brake piston. Thus, the present compensating mechanism serves not as a "push rod adjustment" but rather as a direct, brake linkage adjustment, operating either as a "fulcrum adjuster" or as a "connecting rod adjuster."

Present air brake cylinders exhibit an air-actuated piston and a hollow, tube-like piston rod connected thereto. A push rod is slideably disposed within the piston rod to abut against the piston and generally is supplied with a clevis connection which is directly connected to the brake rigging proper; thus, when the hand brake (connected by a chain to the push rod clevis) is actuated, the push rod can travel in and out of the hollow piston rod without coaction therewith or with the piston. Direct connection between the push rod and the piston rod is undesirable owing to the hollow nature of the piston rod (and resultant strength considerations) and also because of additional gear (such as a jack-knife lever) otherwise required to provide for hand brake operation.

A principal object of this invention therefore is to adjust automatically the length of the connecting linkage between the air-operated, brake-actuated piston and the brake rigging, in accordance with wear in the brake rigging or brake shoes or increased thickness of new shoes when installed, so that the brake applying stroke of the said actuating piston will be maintained substantially continuously at a constant given length. In the case of the present invention this principal object is accomplished in a manner and by a means which exhibit optimum reliability, less complexity and necessitate less manufacturing cost than devices of the type described which have been used heretofore.

Another object of the present invention is to adjust automatically the air brake piston travel, which has been above described, by and during the brake applying movement of the brake system; this is to say, linkage adjustment is caused to transpire during the return strokes of one or a plurality of brake sets themselves.

A still further object is to adjust individually and independently the brakes of each associated railway car, for example, or other vehicle unit and thus maintain the same effective brake pressure and action on each of them.

A principal object of the invention is to provide a mechanism, responsive to deviations in desired piston rod travel, for adjusting the slack in the brake rigging, either by adjusting a lever fulcrum of the rigging or by adapting the mechanism to serve as a connecting rod exhibiting variable effective length, thereby leaving the push rod of the braking system uncoupled from the piston rod within which it is slideably disposed.

Another principal object is to provide overload means (such as a spring) in the adjusting mechanism so that, if brake rigging is tight, no adjustment will be accomplished until the brakes are almost completely released.

In accordance with the present invention a threaded adjustment rod is threadably contained by an adjustment gear, the latter being in engagement with a transmission gear coupled to a drive pinion. An adjustment unit carries with it a pair of racks alternately engageable with the drive pinion and is directly connected to the hollow piston rod of the air brake cylinder, by either a rigid or a flexible connector, so as to proceed longitudinally in accordance with the travel of the piston and piston rod. The adjustment unit exhibits a spring loaded finger which is in engagement with a selector plate, the latter exhibiting a plurality of round-trip travel paths for the finger as defined by a plurality of valleys, ridges and direction dogs. The racks and path patterns of the selector plate are so arranged that rack engagement with the drive pinion can occur, if at all, only during return trips of the piston rod. If the preceding brake set is accomplished at the normal piston travel (of eight inches, for example), then the finger will follow a central path in its return along the selector plate so that there will be no engagement by either rack with the drive pinion of the mechanism. If brake set is accomplished only after the piston has exceeded its normal eight inches of travel, then, on its return the finger will be deflected in its then selected path on the selector plate so as to cause a particular one of the racks associated with the adjustment unit to come into engagement with the drive pinion. This in turn results in a corresponding longitudinal movement of the adjustment rod within the adjustment gear so as to effect a proper displacement of a fulcrum of the linkage or, in another embodiment of the invention, to alter the effective length of the mechanism when serving as a connector rod. A similar but opposite effect is attained when short piston travel is experienced.

Overload means are included so that where brake linkage is tight, for one reason or another, no adjustment will occur until after the brakes are almost completely released.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 2 is a side elevation taken along the line 2—2 in Figure 1, with the brake rigging itself being deleted for purposes of clarity.

Figure 3B is a fragmentary side elevation of the slide rod of the invention, illustrating the end thereof which is associated with the adjustment unit of the invention.

Figure 4 is a fragmentary view taken along the line 4—4 in Figure 2.

Figures 3, 5:
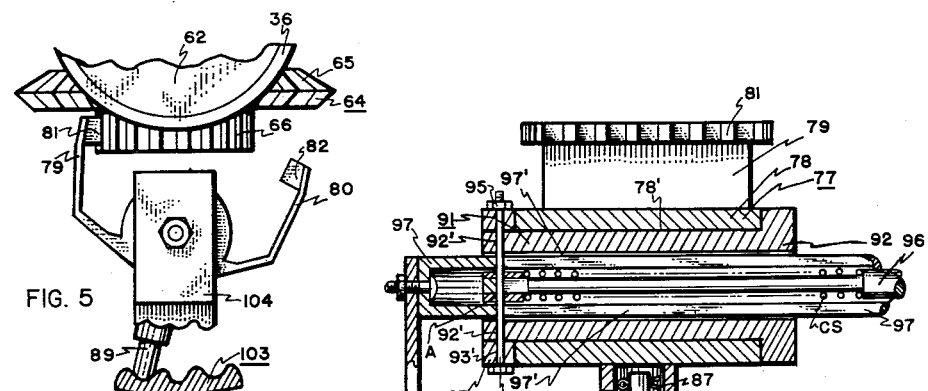
Figure 3 is a fragmentary, horizontal section of the adjustment unit (with directly associated structure) of the invention as taken along the lines 3—3 in Figures 2 and 10, with the hollow body of the adjustment unit (including the racks and finger thereof), the selector plate, and the attachment bracket therefor being rotated 90° for purposes of clarity of illustration.
Figures 6, 7:
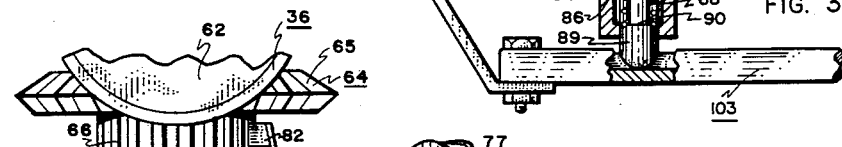

Figures 5 and 6 are partially sectioned views, similar to the fragmentary view shown in Figure 4, and showing alternate rack engagement with the pinion of the apparatus.

Fig. 7 is a sectional view taken along the line 7—7 in Figure 4, illustrating the configuration of the drive pinion and rack pair when the sensing finger illustrated in Figures 5 and 6 is in neutral position.

Figure 8 is a bottom view of the gear housing in one embodiment of the invention, the same being illustrated in vertical section in Figure 2.

Figure 9 is a schematic diagram of a braking system, shown in fragmentary view wherein the mechanism of the invention operates as a variable-length connecting rod in the brake rigging, the object in view being to adjust rigging slack in accordance with proper piston travel.

Figure 10 is a side elevation, partially shown in vertical section, of the compensating mechanism of the present invention when the same is used as a variable-length, connecting rod device for adjusting rigging slack as is indicated in Figure 9.

Figure 1:
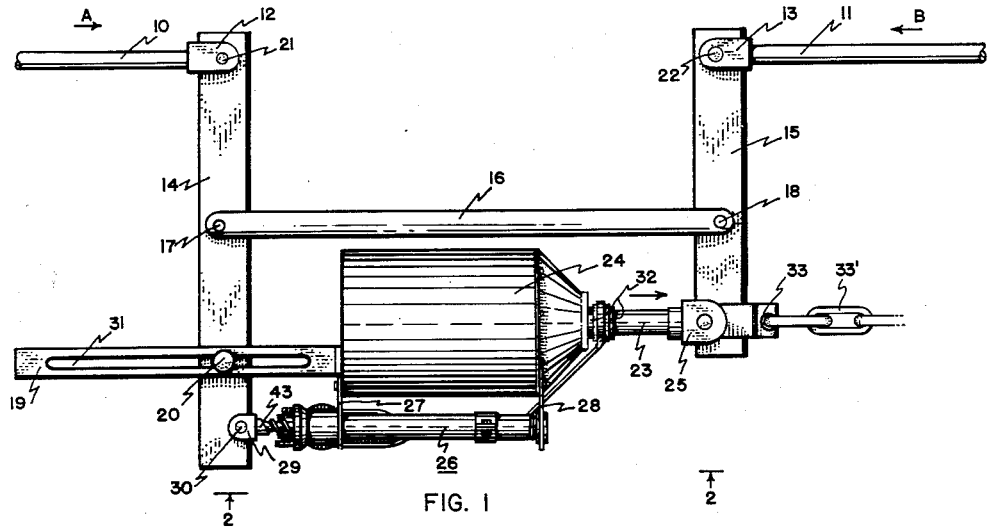
Figure 1 is a fragmentary plan view of representative brake rigging including a conventional air brake cylinder, with the device of the present invention shown as mounted to the cylinder and connected to one of the brake rigging levers, the object in view being to adjust the fulcrum of this lever.

Figure 11 is a schematic diagram of a braking system, shown in fragmentary view, wherein the mechanism of the invention operates as a fulcrum adjuster, as in Figures 1 and 2, but wherein the mechanism is remotely disposed with respect to the air brake cylinder and is coupled thereto by the flexible connector arrangement illustrated in the Figures 9 and 10 embodiment.

Figure 12 is a view taken along the line 12—12 in Figure 10 and illustrates one of the clamping connections employed therein.

Figure 13 is a view taken along the line 13—13 in Figure 10 and illustrates a second clamping connection of the mechanism.

Figure 14 is a view taken along the line 14—14 in Figure 10 and illustrates a third clamping connection of the mechanism.

Figure 15 is a view taken along the line 15—15 in Figure 10 and illustrates the brackets (with their enclosed tube) which are mounted to the air cylinder or other structure.

Figure 16 is an elevation of the locking ring (see Figures 2 and 10) employed to lock the bearings within the gear housing of the apparatus.

Figure 17 is a bottom view of the gear housing in the Figure 10 embodiment of the invention.

Figure 18 is a front elevation of the end wall ring of the housing illustrated in Figures 2 and 8.

Figure 19 illustrates the collar which is mounted to the piston rods illustrated in Figures 2 and 10.

Figure 20 is the plan view of the selector plate side elevations of which are illustrated in Figures 2 and 10.

Figure 21 is a fragmentary sectional view taken along the line 21—21 in Figure 20, and illustrates a representative dog found in the design of the selector plate.

In Figure 1 the brake rigging illustrated in fragmentary view includes a pair of brake rods 10 and 11 having the customary, clevis end connections 12 and 13, brake levers 14 and 15, connecting rod 16 affixed to levers 14 and 15 by means of conventional pivot pins 17 and 18 or other pivotal connections, a fixed disposition slotted plate 19, and a large-head pin 20 connecting lever 14 to the plate 18. Pivot pins 21 and 22 connect the brake rods 10 and 11 to the levers 14 and 15, respectively, as shown.

In conventional brake rigging the pin 20 in fact comprises a bolt and nut combination or other suitable device so that the pin 20 may in fact constitute the fulcrum of lever 14. Thus, when push rod 23 associated with brake cylinder 24 is caused to thrust outwardly against the lower end of lever 15 (by virtue of the clevis connection 25) the brake rods 10 and 11 will tend to proceed in directions indicated by the respective arrows A and B so as to cause brake set. Owing to the presence and function of connecting rod 16, the point at which brake set is accomplished may be adjusted merely by adjusting the fulcrum (i.e. the position of pin 20) of lever 14. Normally this has to be done by hand. In the case of the present invention, however, the compensating mechanism 26 of the present invention is mounted to the brake cylinder by brackets 27 and 28 and connects to the lower end of lever 14 by means of clevis connection 29 and pin 30. The pin 20 is thus made free to move within slot 31 of plate 19, and the mechanism 26 is designed to be responsive to variations in travel of piston rod 32 so as to adjust the fulcrum of lever 14. It will be noted, however, that in reality the pin 30 of the apparatus now becomes the fulcrum of lever 14. Conceivably, plate 19 and pin 20 may be removed. If retained, however, the slot 31 must be large relative to the shank of pin 20 so that the slight, arcuate motion of the latter in accordance with fulcrum changes will not impede the action of lever 14. In connection with Figure 1 it should be noted that the clevis 33 and chain 33' lead to the hand brake of the braking system, which necessitates that the push rod 23 be independent of and free to move within hollow piston rod 32 (see, for example, Figure 9). Notice should also be taken in connection with Figure 1 that if the piston travel required to accomplish brake set is too long, and therefore brake rigging slack must be taken up, then the fulcrum (pin 30) of lever 14 and connecting rod 16 must be translated to the left by apparatus 26. If, however, brake set is accomplished by piston travel which is less than the normal eight inches, then the connecting rod 16 must be translated slightly to the right, accomplished by translating the fulcrum (pin 30) of lever 14 to the right.

Reference is now made to Figure 2.

In Figure 2 the brackets 27 and 28 are of conventional design (see Figure 15) and may be used both in the Figure 2 and Figure 10 embodiments. In the case of the Figure 2 embodiment, however, a pair of additional apertures 34 and 35 should be included in bracket 27 for the mounting of gear housing 36. Tube 37 is welded or otherwise affixed within aperture 38 (see Figure 15) of bracket 27. However, the rear end portion 39 of tube 37 may be conveniently threaded and supplied with retaining nuts 40 as illustrated in Figure 2. The two brackets 27 and 28 have mounting apertures 41 (see Figure 15) to accommodate mounting bolts 42 which mount the same to the brake cylinder 24. Adjustment rod 43 includes the clevis end 29 having pin 30 (see also Figure 1 in this connection) and also a securing nut 44. The shank 45 of adjustment rod 43 is threaded substantially the length thereof, save for the end region 46 which is of reduced diameter. The purpose for the region 46 is one of safety, so that the adjustment rod will not be extended too far out of the adjustment gear 47 (hereinafter to be described in detail). A collar 48 threads onto shank 45 in the manner illustrated, with set screw 48' being provided this connection.

In the preferred embodiment shown, adjustment gear 47 includes bevel gear portion 49 and shank 50. The adjustment gear 47 is interiorly threaded and the inner race of bearing 51 (a multirace conical bearing set of standard design) abuts gear shank shoulder 52 and is secured in place by locking ring 53. As illustrated in Figure 16 the locking ring 53 includes an interiorly threaded ring 54 provided with radial apertures 55 and a C-configured wire 56 having the ends 57 thereof turned inwardly so as to pass through the aperture 55 and engage the threaded end 58 of gear shank 50. Housing 36 is contoured as shown in the Figure 2 embodiment and is provided with end apertures 34' and 35' so that the housing 36 may be secured to bracket 27 by means of the mounting bolts 59. Housing 36 in Figure 2 and housing 60 in Figure 10 are each interiorly threaded at the flared end 61 thereof, housing 36 having externally threaded end wall 62, the washer-like configuration of which is illustrated in Figure 18. It will be noted that in connection with Figure 18 that the end wall 62 includes an interior aperture 63 so for the admission of adjustment rod 43.

Next to be considered is the gear unit 64. This gear unit includes transmission gear 65 of the bevel type and cooperable with adjustment gear 47, and also a pinion gear 66. In practice the transmission gear 65 and pinion gear 66 may be cast as an integral unit as illustrated in Figures 2 and 10. (In both the Figure 2 embodiment and the Figure 10, the gear unit 64 and mounting thereof are identical.) A stud 67 is press fitted within bore 68 located in the under side of housings 36 and 60 in Figures 2 and 10. The stud 67 includes a shoulder 69 which secures the inner race of bearing 70 (with the cooperation of nut 71) upon threaded end 72 of stud 67. A set screw 74 retains the outer race of bearing 70 against gear unit shoulder 73 in a conventional manner. Thus, transmission gear 65 and pinion gear 66 rotate together about stud 67. (Again, this is true for both the Figure 2 and Figure 10 embodiments.)

It will be noted in connection with the Figure 2 embodiment that the undersurface 36' (see Figure 8) of housing 36 is milled or cast flat and is provided with the bore 68. This flat surface enables the close mounting of the gear unit 64 to this undersurface 36'. It will be noted in connection with Figures 2 and 8 that the area 75 of the housing is open, thereby permitting the engagement of transmission gear 65 with adjustment gear 47. Hence, the adjustment gear and bearing structure are enclosed within the housing 36 and only a small area, i.e. area 75, is open for bevel gear mesh. In case of the housing of the Figure 10 embodiment, the undersurface 74 is not flat as in the Figure 8 housing. In practice, however, it is believed that either the Figure 8 or the Figure 17 housing is adaptable for either the Figure 2 or the Figure 10 embodiment of the invention. In any event, both housings will include apertures 75' which are designed to admit set screws 76 (see Figures 2 and 10) to secure the bearing structure 51 (at bores 51') against rotation.

As described thus far it is seen that the invention includes a housing 36 fixedly mounted to the exterior of the air brake cylinder 24. The adjustment gear 47 is freely turnable within conventional bearing structure 51 but is not subject to motions of translation. When means, hereafter to be described, rotate the drive pinion 66, a corresponding rotation will be imparted to transmission gear 65 and adjustment gear 47 so as to withdraw or extend adjustment rod 43 relative to housing 36 and end wall 62, the extension or withdrawal of same being dependent upon the particular type of rotation of drive pinion 66. The apparatus producing such rotation will now be described.

The assembly which produces the alternate rotation of drive pinion 66 is selector finger and pinion engagement unit 77, hereinafter simply referred to as "engagement unit 77." As may be seen with reference to Figures 2, 3, 3B, 5, 6 and 7, engagement unit 77 has a hollow body 78 including wing-like extensions 79 and 80 to which racks 81 and 82 are respectively attached as by means of welding; body 78 also includes a finger extension 83. Finger extension 83 exhibits bore 84 and a pair of shoulders 85 and 86 which constitute abutments for cotter 87 and spring 88 respectively. Finger 89 includes an internal shoulder 90 which presents a second and final abutment for spring 88. The design of the finger extension and the spring-loaded finger are strictly conventional. The body 78 of engagement unit 77 is slidably and pivotally mounted upon spool 91 (at bore 78') comprising a flanged base member 92 and a ring 93, the latter being secured to the former by bolt 94 and nut 95, with bolt 94 passing through apertures 92' and 93' of flanged member 92 and ring 93, respectively. Also secured to engagement unit 77 by bolts 94 and 95 is slide rod 96, this slide rod extending (to the right) through slotted sleeve 97 and configured at 98 to attach by clamp and attachments 99 and 100, respectively, to collar 101. Collar 101 is cylindrical and takes the form of a short girth spool as illustrated in Figure 19. Recess 102 of collar 101 provides a suitable amount for conventional clamp 99. Collar 101 is pinned or otherwise secured to piston rod 23 in a conventional manner.

In turning now to the left side of slide rod 96 it will be seen that the slide rod 96 comprises a rod length L provided with a shank S of reduced diameter and exhibiting longitudinal slot LS (of restricted length) and a shoulder S', with compression spring CS operatively disposed between shoulder S' and the shoulder S'' as offered by the collar C, the latter being slideably disposed upon shank S. Collar C is provided with aligned, radial apertures A which accommodate the positioning therewithin of bolt 94 in Figure 3. Bolt 94 rides within shank slot LS.

The sleeve 97 is seen to be slotted on opposite sides at 97'. Accordingly, and by the engagement of the left end of the shank slot LS with bolt 94, the slide rod 96 and engagement unit 77 will be pulled to the right when piston rod 32 of the air brake cylinder is caused to extend outwardly toward brake set condition. A detailed description of its slide rod action for return trips of piston rod travel will be given hereinafter. It suffices now to state that withdrawal of the air brake piston rod will produce a translation to the left of the slide rod 96 and engagement unit 77.

There remains to be discussed the piston travel sensing and finger return-patch selecting plate, specifically shown in Figure 20 and hereinafter referred to as "selector plate 103." Selector plate 103 is made stationary by conventional brackets 104, 105, 106 and 107 and by the employment of attachments 108. As illustrated in Figure 2 the right end of sleeve 97 is secured to bracket 106 by means of U-bolt 109, with the threaded ends (not shown) of same passing through bracket apertures 106' and held in place by nuts 110.

It will be noted with reference to Figures 20 and 21 that the selector plate 103 includes a plurality of ridges 111 delineating a plurality of valleys 112. In practice the selector plate 103 will be cast, with the valleys constituting depressions in the plate. It will be noted that the selector plate 103 has a plurality of one-way direction dogs A', B', C', D', E' and F' which separate the various valleys as shown. The direction of the arrows relative to these dogs indicates the one-way direction of travel permissible. It will be understood that the several valleys with their associated dogs offer three round-trip travel paths for finger 89, the particular travel path selected depending upon the then condition of travel of piston rod 32 as is necessary to accomplish brake set.

The most convenient way of describing the pattern of the valleys, ridges and dogs in the selector plate shown in Figure 20 is to illustrate the travel of finger 89 (shown in Figures 2, 3, 5 and 6) through the valleys and over the direction dogs thereof for various conditions of piston travel.

Assume as a first condition that desired piston travel is eight inches and that the brake rigging and brake shoes are in normal condition so that normal piston travel of eight inches will accomplish a complete brake set. In this event, when the brake cylinder is actuated so as to advance piston rod 32 in Figure 2 to the right of the viewer then finger 89 will begin at point O in Figure 20, will travel forwardly (to the right of the viewer) through valley A, over dog D', through the right half of valley B, over dog E', and into the region of valley C which lies between dog E' and dog F'. "Normal piston travel" generally is considered to exist where variation of piston travel does not exceed ⅜ of an inch either way from the nominal value (this resulting in an overall distance between dogs E' and F' of three-quarters of an inch). Since in the present case normal piston travel (i.e., within ⅜ of an inch either way) is found to exist, then, after brake set has been released, the piston and piston rod will return to their original inoperative position (by the brake cylinder return spring) so that finger 89 will return to starting point O through valley C, over dog C', and through valley A to point O. Thus, there is no rotational deflection of finger 89 during its return trip. Now it is true that during the forward stroke of normal piston travel the control finger did pass over dog D' and did become deflected in a clockwise direction. However, point H in Figure 20 indicates the point at which rack 81 will engage drive pinion 66. Thus, travel in valley B to the right of point H will produce no engagement between rack 81 and drive pinion 66. Further, the return of the finger to point O is directly down channel C and A so that the finger 89 will slip inbetween and past both rack gears 81 and 82. Hence, where the normal condition exists, i.e., where piston rod 32 travels eight inches to accomplish complete brake set, there will be no engagement of the racks 81 and 82 with drive pinion 66 either during the forward or return trip of adjustment unit 77.

Suppose, however, that there exists a situation of short piston travel wherein brake set is accomplished before the piston has achieved its normal eight-inch stroke. Referring again to Figure 20, it will be seen that the finger 89 will start again at point O, travel through valley A, over dog D', and stop somewhere within valley B, the precise point of stoppage in valley B being determined by the point at which brake set is achieved. Upon the release of the brakes the finger will return to point O via channel B and, in doing so, the finger will reach point H in valley B. This time there has not only been a deflection in a clockwise direction of the finger, owing to finger travel over dog D' into valley B, but also the finger has reached point H in valley B, which point determines the point at which rack 81 engages drive pinion 66. This rack and pinion engagement causes drive pinion 66 and transmission gear 65 to rotate in a counterclockwise direction (looking down upon these gears with reference to Figure 2) which in turn produces a counter-clockwise rotation of adjustment gear 47 (looking from left to right) so that adjustment rod 43 will proceed to thread itself inwardly (from left to right) within adjustment gear 47, and in doing so shorten length of the adjustment rod which protrudes outwardly (to the left) from end wall 62. Of course, it will be understood that once gear turning has been accomplished, the finger and rack will move past drive pinion 66 so that the finger 89 will again achieve point O in Figure 21. Referring now to Figures 1 and 2 it will be seen that this inward movement of adjustment rod 43 translates the connecting rod 16 in Figure 1 slightly to the right, together with the associated levers, so as to require a longer piston travel to accomplish brake set via push rod 23. If normal (eight inch) travel is not yet achieved, the process above described will be repeated so as further to lengthen piston travel.

Assume in the third instance that during a brake set long piston travel has occurred to accomplish the same. In experiencing such a condition the control finger 89 will pass from point O, through valley A, over dog D', through the right half of valley B, over dogs E' and F', and into the extension D" of valley D before brake set is achieved. In such event, upon release of the brakes the return stroke of the piston will return the finger from extension D" into the valley D proper until the finger arrives at point G. Point G marks the point at which rack 82 (see Figure 6) will come into engagement with drive pinion 66. As the finger proceeds towards starting point O, the passing of rack 82 (in engagement with drive pinion 66) will cause drive pinion 66 with its transmission gear 65 to rotate in a clockwise direction (looking down), thus producing a clockwise rotation in adjustment gear 47 (looking from left to right); this action results in a translation of adjustment rod 43 to the left of the viewer, the same threading within adjustment gear 47 outwardly from housing 36 so as to increase that portion of the adjustment rod 43 which extends to the left of the gear housing. Referring again to Figure 1 it will be seen that this action pulls the connecting rod 16 to the left, with its associated levers, so as to reduce the length of piston travel required to accomplish brake set. Again, if one cycle of the above is insufficient to reduce the piston travel required to accomplish brake set to eight inches of travel, then a second cycle will subsequently occur. (Again, once the turning of the gears has been completed the adjustment unit 77 will slip past the drive pinion and finger 89 will again come to initial point O in Figure 20.)

It will be noted in connection with the above that, assuming engagement for the entire length of the rack, the degree of each adjustment will depend upon the length of each respective rack. Further, it will be noted that irrespective of excessive or short piston travel, a single brake set will produce only a constant, discrete adjustment of the linkage. For all practical purposes no variable adjustment of brake linkage during a single brake set need be required since wear in the brake rigging and brake shoes is a gradual process.

While the transmission and adjustment gears are shown as 45° bevel gears, conceivably other types of gears might reasonably be employed.

Assume that either by reason of short piston travel condition, hand brake take-up, or other reason, the condition of "tightness" in brake rigging is present. Then, in the absence of a safety feature, sufficient slack might not be present to permit an adjustment to be made during the return stroke of the piston rod of the air brake cylinder. For this contingency the invention provides the spring, collar, and slotted shank in slide rod design, illustrated in Figures 3 and 3B. It will be readily seen therein that if, upon the initial engagement of one of the racks with the drive pinion, a no-slack condition exists in the rigging, pinion 66 will be prevented from turning and engagement unit 77 will be prevented in its travel to the left. But slide rod length L of slide rod assembly 96 will continue its return travel (with that of piston rod 32) to its initial position at the extreme left. If by that time (and upon the complete release of the brakes) sufficient slack exists in the rigging to permit the gearing in the mechanism to turn, then spring CS will push the engagement unit 77 through the rack-pinion engagement until engagement unit 77 also achieves its initial disposition to the left of drive pinion 66.

At this juncture the second embodiment of the present invention as illustrated in Figures 9 and 10, in particular, will be discussed. It will be noted in connection with Figure 9 that instead of regulating the fulcrum of one of the levers L of the brake rigging the compensating mechanism serves as a variable-length connecting rod as is illustrated at 111 in Figure 9. Control cable 126 indicates that this variable connecting rod 111 is connected to piston rod 32 by clamp assembly 122 so as to be responsive in its exhibited, effective length to variations from normal piston travel associated with brake cylinder 24.

It should be mentioned at the outset that the adjustment unit 77 (see Figure 10) and the gearing and bearings of this embodiment are identical to the Figure 2 embodiment. Only the differences between the two systems will be pointed out. Instead of an end wall 62, the outer, flared end of housing 60 threadedly receives the threaded flange 117 of tubular work member 114, this extension being provided with a clevis 115 and a connecting pin 116. See also Figure 9. As shown, the flange 117 engages the interior threads (at 61) of housing 60. Adjustment rod 43' has its clevis 29' and pin 30' on the end reverse to that shown in Figure 2 and, in addition to having non-threaded, safety area 46', is supplied with a threaded interior connection 117, to provide a two-piece rod convenience of installation and disassembly. Threaded into housing 60 at 118 is a hollow tube 119 which is employed to prevent accumulations of dirt and other foreign substances at or near the large S thread of adjustment rod 43'. Clamp assembly 120 (see Figures 10 and 12) mounts the slide rod 97 to tubular work member 114. The bracket and clamp assembly 121 (see Figures 10 and 13) mounts sleeve 97 and selector plate 103 to tube 119. Further, clamp assembly 122 (shown in Figures 14 and 10) secures rod 123 to piston rod 32 of air brake cylinder 24. The bracket and clamp assemblies shown in Figures 10, 12–14 are all strictly conventional attachments. Tube 37 is mounted to air brake cylinder 24 (see Figures 9 and 10) with brackets 27 and 28 in a manner substantially identical to that shown in Figure 2, with the sole exception that tube 37 extends slightly to the left of bracket 27. This is for the purpose of accommodating the end fitting 124 of flexible casing 125, the latter being associated, as a sheathing, with flexible cable 126. The casing 125 and flexible cable 126 operate as a conventional, control cable assembly or "Bowden wire," with the forward (left) end of flexible cable 126 being secured to slide rod 96' by collar 127. Slide rod 96' is exactly the same configuration as slide rod 96 in Figure 2, except that it is shorter and does not possess the angulated portion 98 (see Figure 2). The purpose for the inclusion of the flexible cable 126 and sheathing 125 is to connect the engagement or adjustment unit 77 to piston rod 32 since the latter will in some instances be quite removed in location from the connecting rod position. The (right) end of flexible cable 126 is shown in Figures 9 and 10 to be connected to slide rod 123 by collar 129 in usual manner. Thus, the longitudinal motion of piston rod 32 will produce a corresponding motion in adjustment unit 77. (The attachment of clamp assembly 122 in Figures 10 and 14 to piston rod 32 is by means of piston rod collar 101, and this attachment was described heretofore with reference to Figure 2.)

Again, selector plate 103 is supplied and is exactly the same in design (as is also adjustment unit 77) as in the Figure 2 embodiment; the two operate in a manner identical to that heretofore explained. Adjustment rod 43' is threaded into gear 47 in the same manner as before. Clevis connection 29' may be considered as being on the reverse end of the adjustment rod. Thus, the long travel and short travel routes of finger 89 over selector plate 103 produces the same rack engagement with the drive pinion 66 and the same type of adjustment with respect to desired brake set. This will at once be seen with reference to Figures 1 and 9 since a thrusting of the lower end of lever 14 (in Figure 1) to the left will produce an identical effect as the shortening connecting rod 16 (111 in Figure 9). If a short piston travel exists, the Figure 5 engagement will occur on the return stroke of the piston rod so as to lengthen the effective length of the connecting rod apparatus illustrated in Figure 10. Correspondingly, long piston travel will produce a rack and pinion engagement as seen in Figure 6, with a corresponding shortening the over all length of the connector rod apparatus illustrated in Figure 10, the same being effectuated by a withdrawal, through rack and pinion engagement, of the adjustment rod 43 to the left of the viewer.

Referring now to Figure 11, if a fulcrum adjustment is desired but the lever fulcrum F is remote from air brake cylinder 24, then the adjustment mechanism 26, instead of being mounted to the cylinder 24, is secured to the car structure CS and is modified (being referenced as 26' in Figure 11) by incorporating in its structure slide rod 96' and the sheath and control cable apparatus of Figures 9 and 10 in lieu of slide rod 96 in Figure 2. Thus, connecting rod CR is of fixed length, and the compensating mechanism 26' in Figure 11 of itself operates to adjust the slack in the braking system.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. For a braking system which includes brake linkage, a brake cylinder having a brake operating piston and a hollow piston rod, and a push rod disposed within said piston rod, actuatable by said piston, and connected to said rigging, a compensating mechanism to adjust slack in said rigging for enabling brake set to be achieved at desired piston travel, said compensating mechanism including, in combination: an actuating, adjustment rod securable to said brake rigging and having a threaded shank; an internally threaded adjustment gear threadably receiving said threaded shank of said adjustment rod; means securing said adjustment gear against translatory movement when said adjustment rod is caused to thread through said adjustment gear and to be translationally displaced with respect thereto; gear means disposed in engagement with said adjustment gear for rotating said adjustment gear; a selector plate fixedly disposed with respect to said securing means and provided with a plurality of finger deflecting, travel paths corresponding to long travel, short travel, and normal travel conditions as relates to piston travel; an engagement unit; means slideably and pivotally mounting said engagement unit in uniform, spaced relationship with said selector plate, for constraining said engagement unit to longitudinal and also to lateral-pivotal movement with respect to said selector plate, said engagement unit being provided with finger means engageable with said selector plate paths; a pair of rack means for selectively producing in said gear means a selected rotation for translationally displacing, selectively, said adjustment rod, said rack means being alternately engageable with opposite sides of said gear means, on return trips of said engagement unit, in accordance with the pivotal displacement, if any, of said finger means in one of said deflecting paths from neutral position; and means connected to said engagement unit for coupling said engagement unit to said piston rod for longitudinal travel in accordance with the travel of said piston rod.

2. A compensating mechanism according to claim 1 wherein said means connected to said engagement unit includes an overload-spring biased, lost motion connection actuatable during piston return strokes.

3. A compensating mechanism according to claim 1 wherein said means connected to said engagement unit includes a rod length provided with an interiorly slotted shank of reduced diameter and a shank shoulder, a compression-type return spring encompassing said shank and seated to said shoulder, a collar slideably disposed on said shank and exhibiting diameter apertures, abutting said spring, and having bolt means diametrically passing through said collar at said apertures and said slotted shank, wherein said mounting means comprises a tubular sleeve slotted to receive said bolt, and wherein said engagement unit includes a body provided with a bore, a pair of wing-like extensions mounting said rack means, a spring loaded finger as said finger means, and a spool configured device slideably mounted on said slotted sleeve, secured to said bolt, and pivotally mounting said body at said bore.

4. A compensating mechanism according to claim 1 wherein said means connected to said engagement unit includes a rod length provided with an interiorly slotted shank of reduced diameter and a shank shoulder, a compression-type return spring encompassing said shank and seated to said shoulder, a collar slideably disposed on said shank and provided with diameter apertures, abutting said spring, and having bolt means diametrically passing through said collar at said apertures and said slotted shank, wherein said mounting means comprises a tubular sleeve slotted to receive said bolt, said bolt being secured to said adjustment unit.

5. A compensating mechanism according to claim 1 wherein said adjustment gear exhibits a shank and said securing means comprises a housing containing bearing means journalling said adjustment gear at said shank and having at least one housing opening admitting said adjustment rod, wherein said gear means comprises a transmission gear in engagement with said adjustment gear and a drive pinion integral with said transmission gear, said drive pinion and transmission gear being pivotally mounted to said housing.

6. A compensating mechanism according to claim 1 wherein said means connected to said engagement unit includes a flexible control cable for connection to said brake operating piston rod when the latter is remote from the compensating mechanism when installed.

7. As a connecting rod adjuster, the compensating mechanism of claim 5 wherein said housing is provided with a hollow extension selectively admitting said adjustment rod and provided with a rigging end connection.

8. As a connecting rod adjuster, the compensating mechanism of claim 5 wherein said housing is provided with a hollow extension selectively admitting said adjustment rod and provided with a rigging end connection, and wherein said adjustment rod is of two-piece, releasably securable construction, said housing also being provided with a second hollow extension diametrically opposed in position to said first hollow extension and encompassing said adjustment rod.

9. As a connecting rod adjuster, the compensating mechanism of claim 5 wherein said housing is provided with a hollow extension selectively admitting said adjustment rod and provided with a rigging end connection, and wherein said means connected to said engagement unit includes a flexible control cable for connection to said brake operating piston rod when the latter is remote from said compensating mechanism.

10. For a braking system which includes brake linkage exhibiting a movable fulcrum lever, a brake cylinder having a brake operating piston and a hollow piston rod, and a push rod disposed within said piston rod, actuatable by said piston, and connected to said rigging, a fulcrum adjusting, compensating mechanism to adjust slack in said rigging for enabling brake set to be achieved at desired piston travel, said compensating mechanism including, in combination: an actuating, adjustment rod securable to said brake rigging at the fulcrum of said lever and having a threaded shank; an internally threaded adjustment gear threadably receiving said threaded shank of said adjustment rod; means securing said adjustment gear against translatory movement when said adjustment rod is caused to thread through said adjustment gear and to be translationally displaced with respect thereto; gear means disposed in engagement with said adjustment gear for rotating said adjustment gear; a selector plate fixedly disposed with respect to said securing means and provided with a plurality of finger deflecting travel paths corresponding to long travel, short travel, and normal travel conditions as relates to piston travel; an engagement unit; means slideably and pivotally mounting said engagement unit in uniform, spaced relationship with said selector plate, for constraining said engagement unit to longitudinal and also to lateral-pivotal movement with respect to said selector plate, said engagement unit being provided with finger means engageable with said selector plate paths; a pair of rack means for selectively producing in such gear means a selected rotation for translationally displacing, selectively, said adjustment rod, said rack means being alternately engageable with opposite sides of said gear means on return trips of said engagement unit, in accordance with the pivotal displacement, if any, of said finger means in one of said deflecting paths from neutral position; and means connected to said engagement unit for coupling said engagement unit to said piston rod for longitudinal travel in accordance with the travel of said piston rod.

11. For a braking system which includes brake linkage exhibiting a movable fulcrum lever, a brake cylinder having a brake operating piston and a hollow piston rod, and a push rod disposed within said piston rod, actuatable by said piston, and connected to said rigging, a fulcrum adjusting, compensating mechanism to adjust slack in said rigging for enabling brake set to be achieved at desired piston travel, said compensating mechanism including, in combination: an actuating, adjustment rod securable to said brake rigging at the fulcrum of said lever and having a threaded shank; an internally threaded adjustment gear threadably receiving said threaded shank of said adjustment rod; means securing said adjustment gear against translatory movement when said adjustment rod is caused to thread through said adjustment gear and to be translationally displaced with respect thereto; gear means disposed in engagement with said adjustment gear for rotating said adjustment gear; a selector plate fixedly disposed with respect to said securing means and provided with a plurality of finger deflecting travel paths corresponding to long travel, short travel, and normal travel conditions as relates to piston travel; an engagement unit; means slideably and pivotally mounting said engagement unit in uniform spaced relationship with said selector plate, for constraining said engagement unit to longitudinal and also to lateral-pivotal movement with respect to said selector plate, said engagement unit being provided with finger means engageable with said selector plate paths; a pair of rack means for selectively producing in said gear means a selected rotation for translationally displacing, selectively, said adjustment rod, said rack means being alternately engageable with opposite sides of said gear means on return trips of said engagement unit, in accordance with the pivotal displacement, if any, of said finger means in one of said deflecting paths from neutral position; and means, including a flexible control cable, connected to said engagement unit for coupling said engagement unit to said piston rod for longitudinal travel in accordance with the travel of said piston rod.

12. For a braking system which includes brake linkage, a brake cylinder having a brake operating piston and a hollow piston rod, and a push rod disposed within said piston rod, actuatable by said piston, and connected to said rigging, a connecting rod type compensating mechanism to adjust slack in said rigging for enabling brake set to be achieved at desired piston travel, said compensating mechanism including, in combination: an actuating, adjustment rod securable to one point of said brake rigging where one end of a conventional connecting rod would otherwise normally be connected, said adjustment rod exhibiting a threaded shank; an internally threaded adjustment gear threadably receiving said threaded shank of said adjustment rod; means securing said adjustment gear against translatory movement when said adjustment rod is caused to thread through said adjustment gear and to be translationally displaced in respect thereto, said securing means being provided with a hollow extension having a rigging connector connectable to a second point where the conventional connecting rod would be attached; gear means disposed in engagement with said adjustment gear for rotating said adjustment gear; a selector plate fixedly disposed with respect to said securing means and provided with a plurality of finger deflecting, travel paths corresponding to long travel, short travel, and normal travel conditions as relates to piston travel; an engagement unit; means slideably and pivotally mounting said engagement unit in uniform, spaced relationship with said selector plate, for constraining said engagement unit to longitudinal and also to lateral-pivotal movement with respect to said selector plate, said engagement unit being provided with finger means engageable with said selector plate paths; a pair of rack means for selectively producing in said gear means a selected rotation for translationally displacing, selectively, said adjustment rod, said rack means being alternately engageable with opposite sides of said gear means, on return trips of said engagement unit, in accordance with the pivotal displacement, if any, of said finger means in one of said deflecting paths from neutral position; and means, including a flexible control cable, connected to said engagement unit for coupling said engagement unit to said piston rod for longitudinal travel in accordance with the travel of said piston rod.

References Cited in the file of this patent

UNITED STATES PATENTS

| | | |
|---|---|---|
| 751,905 | Fite | Feb. 9, 1904 |
| 753,648 | Wands | Mar. 1, 1904 |
| 1,907,174 | Blair | May 2, 1933 |
| 2,109,036 | Schwentler | Feb, 22, 1938 |
| 2,684,132 | Snyder | July 20, 1954 |
| 2,751,049 | Dorey | June 19, 1956 |